(12) United States Patent
Rohde et al.

(10) Patent No.: US 10,823,031 B2
(45) Date of Patent: Nov. 3, 2020

(54) METHOD AND APPARATUS FOR TURBO BYPASS VALVE OPERATION STRATEGY FOR CLOSE COUPLED SCR

(71) Applicant: Faurecia Emissions Control Technologies, USA, LLC, Columbus, IN (US)

(72) Inventors: John G. Rohde, Columbus, IN (US); Edward Kinnaird, Columbus, IN (US); Madhuri Gandikota, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 134 days.

(21) Appl. No.: 16/136,893

(22) Filed: Sep. 20, 2018

(65) Prior Publication Data
US 2020/0095913 A1  Mar. 26, 2020

(51) Int. Cl.
*F01N 3/20* (2006.01)
*F01N 13/00* (2010.01)
(Continued)

(52) U.S. Cl.
CPC .......... *F01N 3/2053* (2013.01); *F01N 3/208* (2013.01); *F01N 9/00* (2013.01); *F01N 13/011* (2014.06);
(Continued)

(58) Field of Classification Search
CPC ................... F01N 3/2066–208; F01N 2340/06
(Continued)

(56) References Cited

U.S. PATENT DOCUMENTS 6,871,490 B2   3/2005   Liang et al.
8,544,260 B2   10/2013  Boorse et al.
(Continued)

FOREIGN PATENT DOCUMENTS

CN   106894867 A   6/2017
EP   2466084 A1    6/2012
(Continued)

OTHER PUBLICATIONS

U.S. Appl. No. 16/004,603, filed Jun. 11, 2018.

*Primary Examiner* — Mark A Laurenzi
*Assistant Examiner* — Mickey H France
(74) *Attorney, Agent, or Firm* — Carlson, Gaskey & Olds, P.C.

(57) ABSTRACT

An exhaust system includes a first exhaust after-treatment system receiving exhaust gases generated by an engine, a second exhaust after-treatment system downstream of the first exhaust after-treatment system, and at least one bypass connecting an engine outlet to an inlet to the second exhaust after-treatment system. A turbocharger is associated with the bypass and a bypass valve is located upstream of the turbocharger. The bypass valve is moveable between an open position to bypass exhaust gas flow to the first exhaust after-treatment system, a closed position to direct all exhaust gas flow to the first exhaust after-treatment system, and a partially open position where one portion of exhaust gas flow is directed into the first exhaust after-treatment system and a remaining portion of exhaust gas flow is directed into the turbocharger. A controller controls movement of the bypass valve between the open, closed, and partially open positions.

24 Claims, 2 Drawing Sheets

(51) Int. Cl.
  *F02B 37/18* (2006.01)
  *F01N 9/00* (2006.01)
(52) U.S. Cl.
  CPC ........ *F02B 37/183* (2013.01); *F01N 2340/06* (2013.01); *F01N 2410/02* (2013.01); *F01N 2610/02* (2013.01)
(58) Field of Classification Search
  USPC .................................................. 60/280, 295
  See application file for complete search history.

(56) References Cited

U.S. PATENT DOCUMENTS

| | | |
|---|---|---|
| 2007/0271908 A1 | 11/2007 | Hemingway et al. |
| 2008/0127638 A1 | 6/2008 | Vaarkamp et al. |
| 2008/0155968 A1 | 7/2008 | Salemme et al. |
| 2010/0199634 A1 | 8/2010 | Heaton |
| 2011/0011082 A1 | 1/2011 | Mehta et al. |
| 2011/0131978 A1* | 6/2011 | Okada ................... F01N 3/2053 60/602 |
| 2012/0204542 A1* | 8/2012 | Norris ................... F01N 3/2066 60/274 |
| 2012/0216529 A1 | 8/2012 | Joshi et al. |
| 2014/0109553 A1* | 4/2014 | Roberts, Jr. ........... F01N 3/0814 60/274 |
| 2014/0363358 A1 | 12/2014 | Udd et al. |
| 2015/0252706 A1 | 9/2015 | Kosters et al. |
| 2015/0337702 A1 | 11/2015 | Ettireddy et al. |
| 2016/0032803 A1* | 2/2016 | Ettireddy ................ F01N 3/106 60/289 |
| 2016/0166990 A1 | 6/2016 | Phillips et al. |
| 2017/0067382 A1 | 3/2017 | Hillen |

FOREIGN PATENT DOCUMENTS

| | | |
|---|---|---|
| JP | S583810 A | 1/1983 |
| JP | 2004092413 A | 3/2004 |
| KR | 20170049889 A | 5/2017 |
| WO | 2012123660 A1 | 9/2012 |
| WO | 2013051968 A1 | 4/2013 |

* cited by examiner

METHOD AND APPARATUS FOR TURBO BYPASS VALVE OPERATION STRATEGY FOR CLOSE COUPLED SCR

BACKGROUND OF THE INVENTION

A vehicle exhaust system conducts hot exhaust gases generated by an engine through various exhaust components to reduce emissions such as nitrogen oxides NOx, for example. In one known configuration, the exhaust system includes an injection system that injects fluid, e.g. ammonia, a diesel exhaust fluid (DEF), or a reducing agent such as a solution of urea and water, upstream of a selective catalytic reduction (SCR) catalyst. A mixer is positioned upstream of the SCR catalyst and mixes the engine exhaust gases and products of the injected fluid. This mixture is then introduced into the SCR catalyst. The SCR converts the NOx, in the presence of the mixture of exhaust gas and injected fluid, into nitrogen and water. Under low temperature operating conditions, e.g. cold start and/or low flow conditions, this conversion becomes more difficult.

SUMMARY OF THE INVENTION

In one exemplary embodiment, a vehicle exhaust system includes a first exhaust after-treatment system that receives exhaust gases generated by an engine, a second exhaust after-treatment system downstream of the first exhaust after-treatment system, and at least one bypass connecting an engine outlet to an inlet to the second exhaust after-treatment system. A turbocharger is associated with the bypass and a bypass valve is located upstream of the turbocharger. The bypass valve is moveable between an open position to bypass exhaust gas flow to the first exhaust after-treatment system, a closed position to direct all exhaust gas flow to the first exhaust after-treatment system, and a partially open position where one portion of exhaust gas flow is directed into the first exhaust after-treatment system and a remaining portion of exhaust gas flow is directed into the turbocharger. A controller controls movement of the bypass valve between the open, closed, and partially open positions.

In a further embodiment of the above, the controller controls movement of the bypass valve based on exhaust gas temperature, engine flow rate, NOx output, or any combination thereof.

In a further embodiment of any of the above, the first exhaust after-treatment system includes at least a first reductant source, a first mixer, and a first SCR, and wherein the second exhaust after-treatment system includes at least a second reductant source, a second mixer, and a second SCR.

In a further embodiment of any of the above, the first exhaust after-treatment system is immediately downstream of the engine.

In a further embodiment of any of the above, the first SCR is smaller than the second SCR.

In a further embodiment of any of the above, an inlet pipe connects the bypass pipe to an inlet to the first exhaust after-treatment system and an outlet pipe connects an outlet from the first exhaust after-treatment system to the bypass pipe, and wherein the turbocharger is located downstream of the inlet pipe and upstream of the outlet pipe.

In a further embodiment of any of the above, the bypass valve is located in the inlet pipe or in the bypass pipe downstream of the inlet pipe.

In a further embodiment of any of the above, the bypass valve is only in the closed position during cold start or low flow conditions and wherein bypass valve position is actively adjusted by the controller to vary the partially open position during high temperature and/or high flow conditions.

In a further embodiment of any of the above, the at least one bypass pipe comprises at least a first bypass pipe and a second bypass pipe, wherein the first bypass pipe includes the turbocharger, and wherein the second bypass pipe connects the engine outlet directly to the inlet to the second exhaust after-treatment system such that all exhaust flow bypasses the first exhaust after-treatment system and the turbocharger.

In another exemplary embodiment, a method of controlling a valve in a vehicle exhaust system includes locating a turbocharger in the bypass pipe, locating a bypass valve upstream of the turbocharger, wherein the bypass valve is moveable between an open position to bypass exhaust gas flow to the first exhaust after-treatment system, a closed position to direct all exhaust gas flow to the first exhaust after-treatment system, and a partially open position where one portion of exhaust gas flow is directed into the first exhaust after-treatment system and a remaining portion of exhaust gas flow is directed into the turbocharger, and controlling movement of the bypass valve between the open, closed, and partially open positions.

In another exemplary embodiment, a vehicle comprises an engine and a vehicle exhaust system according to any of the embodiments above.

These and other features of this application will be best understood from the following specification and drawings, the following of which is a brief description.

DETAILED DESCRIPTION

Figure 1:
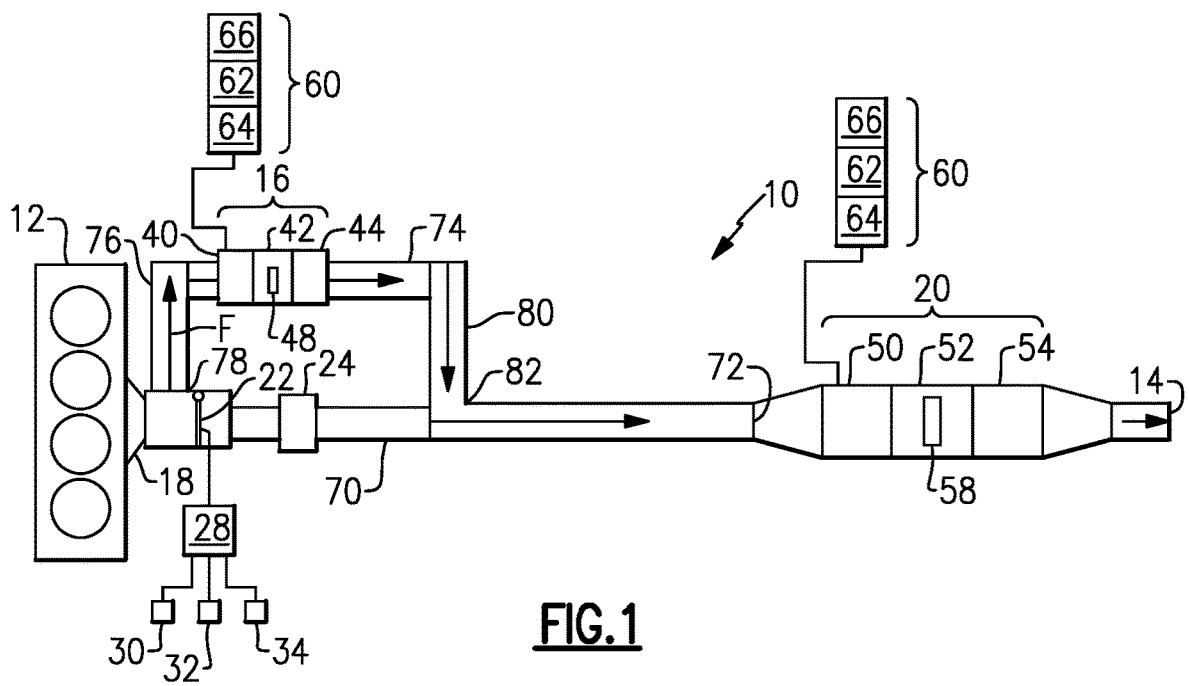
FIG. 1 schematically illustrates one example of a vehicle exhaust system with a turbocharger, valve, and controller according to the subject invention, wherein the valve is in the closed position.

FIG. 1 shows a vehicle exhaust system 10 that conducts hot exhaust gases generated by an engine 12 through various components to an exhaust outlet 14 to atmosphere. The exhaust system 10 includes a first exhaust after-treatment module or system 16 that receives engine exhaust gases from an engine exhaust manifold outlet 18 and a second exhaust after-treatment module or system 20 that is downstream of the first exhaust after-treatment system 16. The second exhaust after-treatment system 20 comprises a primary or main system that is typically located underneath a vehicle floor at some distance from the engine 12. Due to this distance, the second exhaust after-treatment system 20 is not fully effective under all operating conditions, such as cold start conditions for example. Using the first exhaust after-treatment system 16 as a secondary, smaller system that is upstream from the main/primary system 20 provides for a configuration that can operate more effectively at cold start or low flow conditions.

Figure 2:
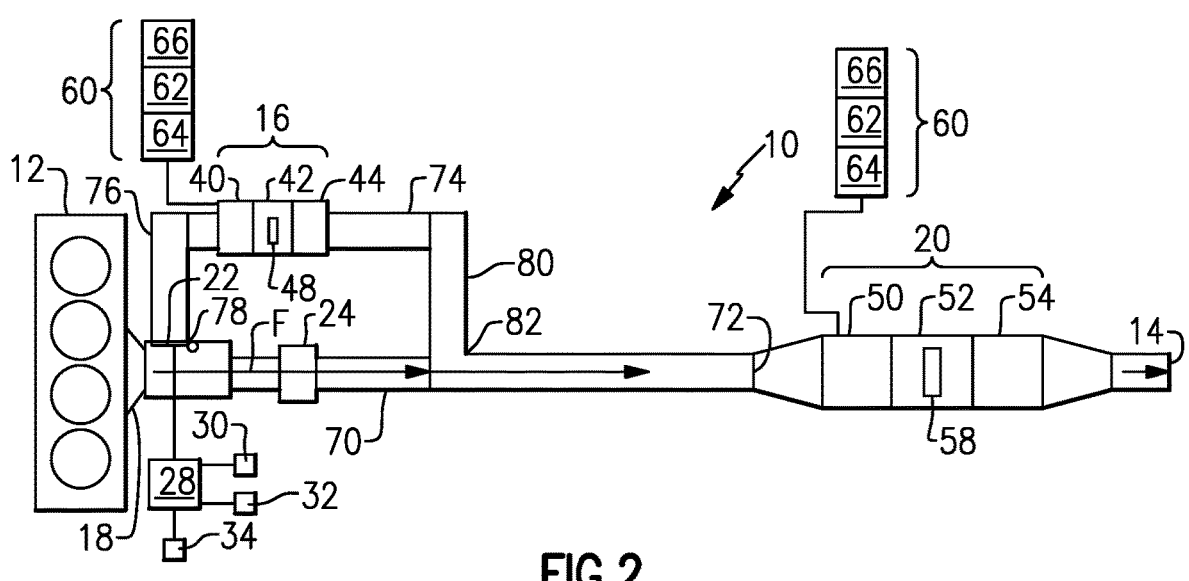
FIG. 2 is similar to FIG. 1 but shows the valve in an open position.

A bypass valve 22 is mounted within the exhaust system 10 to direct exhaust through the first exhaust after-treatment system 16 and/or the second exhaust after-treatment system 20. A turbocharger 24 is located upstream of the second exhaust after-treatment system 20. In one example, the valve 22 is located upstream of the turbocharger 24 and is moveable between at least an open position, closed position, and a partially open and variable position. In the closed position, the valve 22 directs flow F into the first exhaust after-treatment system 16 before the flow enters the second exhaust after-treatment system 20 as shown in FIG. 1. The flow also bypasses the turbocharger 24 when the valve 22 is in the closed position. In the open position, the valve 22 blocks flow to the first exhaust after-treatment system 16 such that all exhaust gas flow F bypasses the first exhaust after-treatment system 16 and is directed into the turbocharger 24 before entering the second exhaust after-treatment system 20 as shown in FIG. 2. When in the partially open and variable position, the valve 22 is positioned such that one portion of flow F1 is directed into the first exhaust after-treatment system 16 and a remaining portion of flow F2 is directed into the turbocharger 24 prior to entering the second exhaust after-treatment system 20.

Any type of valve can be used to control the flow of the exhaust gas between the systems 16, 20. In one example, the valve 22 comprises a valve flap or disc body that is pivotally supported by and positioned to extend across a cross-sectional area of a pipe within which the valve 22 is mounted. The valve 22 can be biased via a spring or other similar element to the closed position. An actuator/controller 28, such as a solenoid or other similar device for example, can be coupled to the valve 22 to control movement thereof.

In one example, the controller 28 controls movement of the valve 22 between the open, closed, and partially open/variable positions based on at least one of engine flow rate and NOx output. At least one flow sensor 30 communicates engine flow information to the controller 28. At least one NOx sensor 32 communicates NOx output information to the controller 28. One or more temperatures sensors 34 communicate exhaust gas temperature information to the controller 28. The sensors 30, 32, 34 can be placed in any of various positions within the exhaust system 10 as needed dependent upon vehicle application, packaging space, etc. In one example, the controller 28 controls movement of the valve 22 based on engine flow rate and in another example, the controller 28 controls movement of the valve 22 based on NOx output. However, the controller 28 can control movement of the valve 22 based on exhaust gas temperature, engine flow rate, NOx output, or any combination thereof.

In one example, the first exhaust after-treatment system 16 includes at least a first reductant source 40, a first mixer 42, and a first selective catalytic reduction (SCR) catalyst 44. In one example, the first mixer 42 may include an internal mixing element 48 to facilitate mixing of injected fluid and exhaust gases. This will be discussed in greater detail below. The second exhaust after-treatment system 20 includes at least a second reductant source 50, a second mixer 52, and a second SCR 54. The second mixer 52 may also include an internal mixing element 58 to facilitate mixing of injected fluid and exhaust gases. Other components, such as a particulate filter, a diesel oxidation catalyst (DOC), and/or a DOC/SCR coated filter, could also optionally be included in one or both of the systems 16, 20. In one example, the first exhaust after-treatment system 16 is immediately downstream of the engine 12 to provide a close-coupled configuration.

In one example, the first 40 and second 50 reductant sources are connected to an injection system 60 that is used to inject fluid (e.g. ammonia, a diesel exhaust fluid (DEF), or a reducing agent such as a solution of urea and water) into the exhaust gas stream upstream from the first 44 and second 54 SCRs such that the respective first 42 and second 52 mixers can mix the injected fluid and exhaust gas thoroughly together. The injection system 60 includes a fluid supply 62, an injector or doser 64, and a controller 66 that controls injection of the fluid as known. The controller 66 can be a separate controller from the controller 28 that controls the valve 22, or a common controller can be used. In this example, two separate injection systems 60 are shown for each of the first 16 and second 20 exhaust after-treatment systems; however, a single injection system 60 could be used for both exhaust after-treatment systems 16, 20. The advantage of using a separate injection system for each of the first 40 and second 50 reductant sources is that two different types of fluid can be used if needed. The advantages of using a single system include a reduced number of components, reduced cost, and less packaging space is required.

In one example, the mixers 42, 52 comprise a mixer body with respective internal mixing elements 48, 58 such as one or more plates and/or baffles, which are configured to thoroughly mix injected fluid with the exhaust gases and subsequently direct the mixture of engine exhaust gas and the injected fluid to the SCRs 44, 54. Any type of mixer 42, 52 can be used in the systems 16, 20. Further, the ammonia source can be combined with the mixing element in a compact mixer configuration for vehicles with tight packaging constraints.

As discussed above, the first exhaust after-treatment system 16 is immediately downstream of the engine 12 in a close-coupled arrangement as shown in FIG. 1. This mounting location is particularly useful for improving operation of the system for cold start or low flow conditions. In one example, the first SCR 44 is smaller than the second SCR 54 because it is only fully utilized at low flow or cold start conditions and the valve 22 allows the flow to bypass the close coupled SCR system 16 at higher flow rates when needed. In one example, at least one bypass exhaust pipe 70 connects the exhaust manifold outlet 18 from the engine 12 to an inlet 72 to the second exhaust after-treatment system 20. A main exhaust pipe 74 is parallel to the bypass pipe 70 and includes the first exhaust after-treatment system 16. The main exhaust pipe 74 includes an inlet pipe 76 that connects an opening 78 at an upstream location in the bypass pipe 70 to the main exhaust pipe 74 at an inlet to the first reductant source 40. An outlet pipe 80 connects an opening 82 at a downstream location in the bypass pipe 70 to the main exhaust pipe 74 at an outlet from the first SCR 44. The flow exiting the outlet pipe 80 is then directed into the inlet 72 to the second exhaust after-treatment system 20.

The turbocharger 24 is located in the bypass pipe 70 downstream of the opening 78 for the inlet pipe 76 and upstream of the opening 82 for the outlet pipe 80. The bypass valve 22 is located upstream of the turbocharger 24 and can be positioned within the bypass pipe 70 or the inlet pipe 76. By locating the bypass valve 22 upstream of the turbocharger 24, the first exhaust after-treatment system 16 can heat up more quickly when the valve 22 is in the closed position. Further, when in the closed position, the exhaust heat does not have to travel through the turbocharger 24, which reduces the heat loss based on less thermal mass. In this mode, because the heat-up time for the close-coupled configuration can occur more quickly, it enhances cold start and low load NOx conversion. When the valve 22 is open or partially open, the exhaust gas will flow through the turbocharger 24 in a normal operating manner and will then enter the second or primary exhaust after-treatment system 20.

The subject invention provides a bypass valve 22, which is able to be opened at various angles throughout the engine operational range. When the valve 22 is in the closed position to block flow through the bypass pipe 70, the exhaust gas flow is forced into the more restrictive close-coupled exhaust after-treatment system 16. The first reductant source 40 is also activated by the controller 28 and/or 66 at this time to inject the fluid as described above. Because this first exhaust after-treatment system 16 is closer to the engine 12, bypasses the turbocharger 24, and has a smaller volume SCR 44, it heats up more quickly and becomes more effective at controlling NOx. The reductant source 50 of the second or main after-treatment system 20 is not activated at this point, and the second or main SCR substrates of the second SCR 54 are not yet at operational temperatures.

In addition to heat gained by bypassing the turbocharger 24, there is also a pressure restriction gain which will help to decrease CO2 (less back pressure compared to exhaust gas passing through the turbocharger 24). Due to the small size of the secondary after-treatment system 16, it is only used at cold start and low flow conditions. The valve 22 is used to allow the flow to bypass the secondary after-treatment system 16 at higher flow rates.

FIG. 2 shows the valve 22 in the open position for normal high flow operations after start-up. In this position, the valve 22 is located upstream of the turbocharger 24 and blocks flow from entering the main exhaust pipe 74 such that all the exhaust gas bypasses the smaller secondary after-treatment system 16 and passes through turbocharger 24 before entering the main after-treatment system 20. As the exhaust gas is travelling through the turbocharger 24, there is some amount of heat loss compared to when the exhaust gas flow is flowing through the secondary after-treatment system 16. The fluid injection is inactivated in the secondary after-treatment system 16 for the close-coupled SCR 42. This configuration offers lower backpressure under higher flow/higher temperature operations as compared to a system that does not include a secondary after-treatment system 16. These higher flow higher temperature operations provide enough heat energy for the larger diameter substrates in the main after-treatment system 20 to heat up and become an effective form of NOx control.

Figure 3:
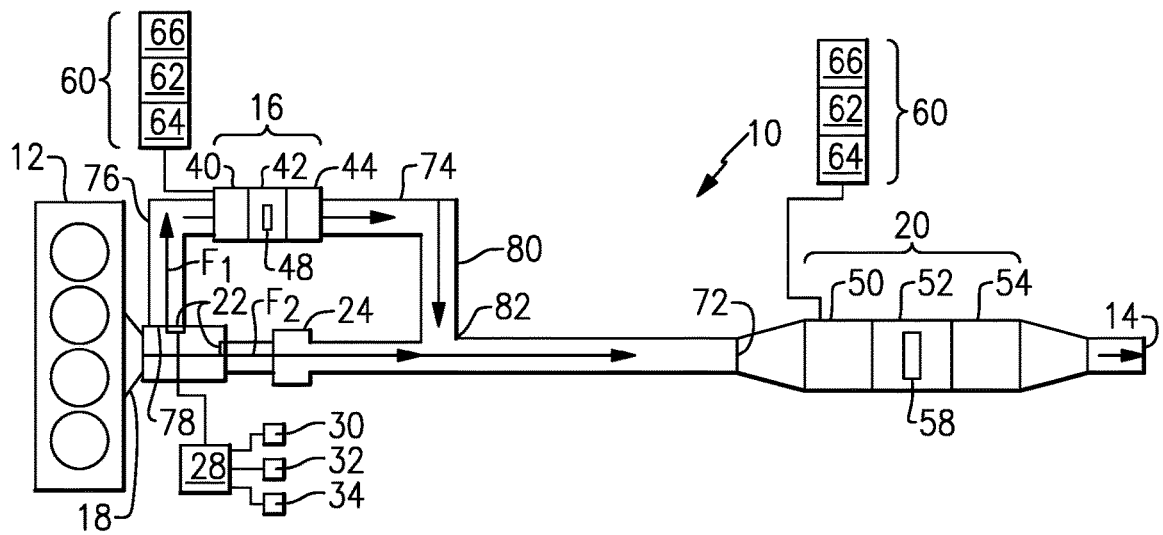
FIG. 3 is similar to FIG. 1 but shows the valve in a partially open position.

FIG. 3 shows the valve 22 in a partially open position with partial flow through both systems 16, 20. This position can be varied by the controller 28 to adjust the amount of flow to each system 16, 20 as needed. As such, the valve 22 can be used at variable angles to make the most effective and efficient use of the close-coupled after-treatment system 16 by capitalizing on the higher upstream temperatures and reducing the average NOx level in the exhaust gas at the main after-treatment system 20. The valve 22 can be controlled to revert to the close-coupled path at times in the duty cycle when the gas flow rate and temperature are low and there is a benefit (in terms of NOx conversion ability) in using the smaller hotter close coupled SCR.

Figure 4:
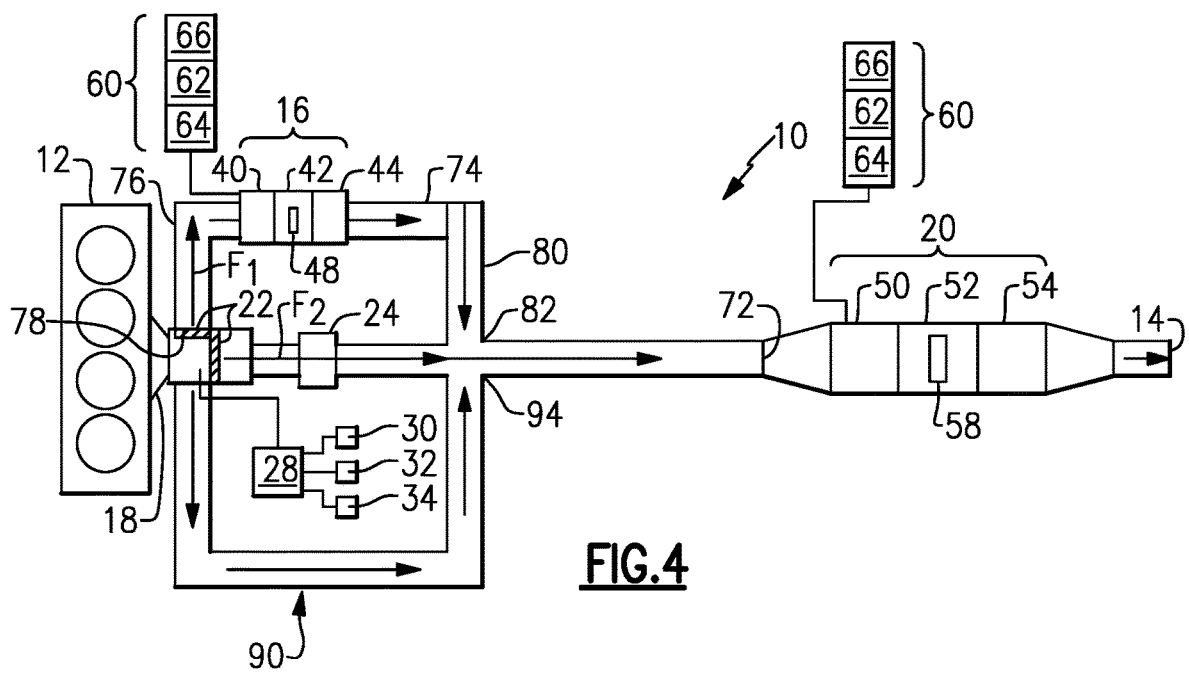
FIG. 4 shows a configuration similar to that of FIGS. 1-3 but with an additional bypass route.

FIG. 4 shows a configuration that includes an additional bypass. In this example, a second bypass pipe 90 is provided that connects the engine outlet 18 directly to the inlet 72 to the second exhaust after-treatment system 20 such that all exhaust flow bypasses the first exhaust after-treatment system 16 and the turbocharger 24. In this configuration, the bypass valve 22 can comprise a 3-way valve, for example. This type of valve allows routing to the first exhaust after-treatment system 16 (FIG. 1), second exhaust after-treatment system 20 (FIG. 2), proportionally between the first 16 and second 20 exhaust after-treatment systems (FIG. 3), or through an empty pipe volume (FIG. 4). The empty pipe volume bypasses the turbocharger and first exhaust after-treatment system 16 to flow directly to the second exhaust after-treatment system 20. The advantage of this empty pipe volume is backpressure reduction. Optionally, the 3-way valve can be positioned to allow proportional flow between the first exhaust after-treatment system 16 (FIG. 1), second exhaust after-treatment system 20 (FIG. 2), and through an empty pipe volume of the second bypass 90. In one example, second bypass 90 includes an upstream connection at 92 to the first bypass at a location that is upstream from the turbocharger 24 and the first exhaust after-treatment system 16. The second bypass 90 includes a downstream connection at 94 to the first bypass at a location that is downstream from the turbocharger 24 and the first exhaust after-treatment system 16. In one example, the second bypass 90 is free from other structures such that a completely empty pipe volume is provided between the upstream 92 and downstream 94 connections.

Thus, the subject invention provides a configuration where the variable control of the valve 22 gives continuous use of the close-coupled after-treatment system 16 while maintaining low pack pressure. The controller 28 controls the valve 22 via a program using an algorithm that is based on engine flow rate, or flow rate and temperature, or NOx output, or any combination of these characteristics. The controller 28 can include a processor, memory, and one or more input and/or output (I/O) device interface(s) that are communicatively coupled via a local interface. The local interface can include, for example but not limited to, one or more buses and/or other wired or wireless connections. Further, the local interface may include address, control, and/or data connections to enable appropriate communications among the aforementioned components.

The controller 28 may be a hardware device for executing software, particularly software stored in memory. The controller 28 can be a custom made or commercially available processor, a central processing unit (CPU), an auxiliary processor among several processors associated with the computing device, a semiconductor based microprocessor (in the form of a micro-chip or chip set) or generally any device for executing software instructions. The memory can include any one or combination of volatile memory elements and/or nonvolatile memory elements as known.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. The controller 28 can be configured to execute software stored within the memory, to communicate data to and from the memory, and to generally control operations of the computing device pursuant to the software. Software in memory, in whole or in part, is read by the processor, perhaps buffered within the processor, and then executed.

In one example, the peak gas flow from the engine 12 may be 1600 Kg/hr, with 9 g/KW hr NOx. The close-coupled after-treatment system 16 may only be able to accommodate 600 Kg/hr (limited by backpressure and SCR volume) so as the flow rate increased from 500 Kg/hr upward, the controller 28 would open the valve 22 proportional to the extra flow to maintain ~550 Kg/hr through the close-coupled after-treatment system 16. With around 30% of the exhaust NOx treated by the close-coupled after-treatment system 16, when the treated and untreated gases merge and mix, the main after-treatment system 20 only has to treat the equivalent of 6 g/KW hr NOx, so the SCR substrates can be smaller, the ammonia introduced at the main after-treatment system 20 can be reduced, and the deposit risk (if using DEF) can be substantially reduced.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A vehicle exhaust system comprising:
a first exhaust after-treatment system that receives exhaust gases generated by an engine;
a second exhaust after-treatment system downstream of the first exhaust after-treatment system;
a first bypass and a second bypass;
a turbocharger associated with the first bypass, and wherein the second bypass connects an engine outlet directly to an inlet to the second exhaust after-treatment system such that all exhaust flow bypasses the first exhaust after-treatment system and the turbocharger;
a bypass valve located upstream of the turbocharger, wherein the bypass valve is moveable between at least a first position to prevent exhaust gas flow to the first exhaust after-treatment system, a second position to direct all exhaust gas flow to the first exhaust after-treatment system, a third position where one portion of exhaust gas flow is directed into the first exhaust after-treatment system and a remaining portion of exhaust gas flow is directed into the turbocharger, and a fourth position to prevent exhaust gas flow into the turbocharger and the first exhaust after-treatment system, and wherein the bypass valve comprises a common valve that moves between the first, second, third and fourth positions; and
a controller that controls movement of the bypass valve between the first, second, third, and fourth positions.

2. The vehicle exhaust system according to claim 1, wherein the controller controls movement of the bypass valve based on based on at least one of engine flow rate and NOx output.

3. The vehicle exhaust system according to claim 2, wherein the controller additionally controls movement of the bypass valve based on exhaust gas temperature.

4. The vehicle exhaust system according to claim 1, including an inlet pipe connecting the first bypass to an inlet to the first exhaust after-treatment system and an outlet pipe connecting an outlet from the first exhaust after-treatment system to the first bypass, and wherein the turbocharger is located downstream of the inlet pipe and upstream of the outlet pipe.

5. The vehicle exhaust system according to claim 4, wherein the bypass valve is located in the inlet pipe or in the first bypass downstream of the inlet pipe.

6. The vehicle exhaust system according to claim 5, wherein the first exhaust after-treatment system includes at least a first fluid source, a first mixer element, and a first SCR, and wherein the second exhaust after-treatment system includes at least a second fluid source, a second mixer, and a second SCR.

7. The vehicle exhaust system according to claim 6, wherein the bypass valve is only in the second position during cold start or low flow conditions and wherein the third position is actively adjusted by the controller during high temperature and/or high flow conditions to vary portions of exhaust gas flow directed to the first exhaust after-treatment system and the turbocharger.

8. The vehicle exhaust system according to claim 6, wherein the first exhaust after-treatment system is immediately downstream of the engine.

9. The vehicle exhaust system according to claim 8, wherein the first SCR is smaller than the second SCR.

10. The vehicle exhaust component assembly according to claim 8, wherein
when the bypass valve is in the first position, all exhaust gas flow to the first exhaust after-treatment system is blocked such that all exhaust gas flow bypasses the first exhaust after-treatment system and is directed into the turbocharger prior to entering the second exhaust after-treatment system,
when the bypass valve is in the second position, all exhaust gas flow is directed into the first exhaust after-treatment system and bypasses the turbocharger before the flow enters the second exhaust after-treatment system,
when the bypass valve is in the third position, one portion of exhaust gas flow is directed into the first exhaust after-treatment system and a remaining portion of exhaust gas flow is directed into the turbocharger prior to entering the second exhaust after-treatment system,
when the bypass valve is in the fourth position all exhaust gas flow to the first exhaust after-treatment system is blocked and all exhaust gas flow to the turbocharger is blocked such that all exhaust flow is directed into the second bypass, and
including a fifth position where one portion of exhaust gas flow is directed into the first exhaust after-treatment system, another portion of exhaust gas flow is directed into the turbocharger, and a remaining portion of exhaust flow is directed into the second bypass to allow for proportional flow between the first exhaust after-treatment system, turbocharger, and through an empty pipe volume of the second bypass.

11. A vehicle exhaust system comprising:
a first exhaust after-treatment system that receives exhaust gases generated by an engine, wherein the first exhaust after-treatment system includes at least a first reductant source, a first mixer, and a first SCR;
a second exhaust after-treatment system downstream of the first exhaust after-treatment system, wherein the second exhaust after-treatment system includes at least a second reductant source, a second mixer, and a second SCR;
a first bypass and a second bypass, the first bypass including at least one first bypass pipe connecting an engine outlet to an inlet to the second exhaust after-treatment system;
an inlet pipe connecting the first bypass pipe to an inlet to the first exhaust after-treatment system;
an outlet pipe connecting an outlet from the first exhaust after-treatment system to the first bypass pipe;
a turbocharger located in the first bypass pipe downstream of the inlet pipe and upstream of the outlet pipe, and wherein the second bypass connects the engine outlet directly to the inlet to the second exhaust after-treatment system such that all exhaust flow bypasses the first exhaust after-treatment system and the turbocharger;
a bypass valve located upstream of the turbocharger, wherein the bypass valve is moveable between a first position to prevent exhaust gas flow to the first exhaust after-treatment system, a second position to direct all exhaust gas flow to the first exhaust after-treatment system prior to entering the turbocharger, a third position where one portion of exhaust gas flow is directed into the first exhaust after-treatment system and a remaining portion of exhaust gas flow is directed into the turbocharger, and a fourth position to prevent exhaust gas flow into the turbocharger and the first exhaust after-treatment system, and wherein the bypass valve comprises a common valve that moves between the first, second, third, and fourth positions; and a controller that controls movement of the bypass valve between the first, second, third, and fourth positions.

12. The vehicle exhaust system according to claim 11, wherein the bypass valve is located in the inlet pipe or in the first bypass pipe downstream of the inlet pipe.

13. The vehicle exhaust system according to claim 12, wherein the first exhaust after-treatment system is immediately downstream of the engine, and wherein the controller controls movement of the bypass valve based on at least one of exhaust gas temperature, engine flow rate, and NOx output, and wherein the bypass valve is only in the second position during cold start or low flow conditions and wherein the third position is actively adjusted by the controller during high temperature and/or high flow conditions to vary portions of exhaust gas flow directed to the first exhaust after-treatment system and the turbocharger.

14. The vehicle exhaust system according to claim 13, wherein the first SCR is smaller than the second SCR.

15. The vehicle exhaust system according to claim 11, wherein the second bypass includes a second bypass pipe, and wherein the second bypass pipe comprises and empty pipe that connects the engine outlet directly to the inlet to the second exhaust after-treatment system such that all exhaust flow bypasses the first exhaust after-treatment system and the turbocharger, and including a fifth position where one portion of exhaust gas flow is directed into the first exhaust after-treatment system, another portion of exhaust gas flow is directed into the turbocharger, and a remaining portion of exhaust flow is directed into the second bypass to allow for proportional flow between the first exhaust after-treatment system, turbocharger, and through an empty pipe volume of the second bypass.

16. A method of controlling a bypass valve in a vehicle exhaust system comprising:

providing a first exhaust after-treatment system that receives exhaust gases generated by an engine, a second exhaust after-treatment system downstream of the first exhaust after-treatment system, a first bypass and a second bypass, with the first bypass including at least one first bypass pipe connecting an engine outlet to an inlet to the second exhaust after-treatment system, and including the steps of:

locating a turbocharger in the first bypass pipe;

connecting the engine outlet directly to the inlet to the second exhaust after-treatment system with the second bypass such that all exhaust flow can bypass the first exhaust after-treatment system and the turbocharger;

locating a bypass valve upstream of the turbocharger, wherein the bypass valve is moveable between a first position to prevent exhaust gas flow to the first exhaust after-treatment system, a second position to direct all exhaust gas flow to the first exhaust after-treatment system, a third position where one portion of exhaust gas flow is directed into the first exhaust after-treatment system and a remaining portion of exhaust gas flow is directed into the turbocharger, and a fourth position to prevent exhaust gas flow into the turbocharger and the first exhaust after-treatment system, and wherein the bypass valve comprises a common valve that moves between the first, second, third and fourth positions, and controlling movement of the bypass valve between the first, second, third, and fourth positions.

17. The method according to claim 16, including positioning the first exhaust after-treatment system immediately downstream of the engine, and controlling movement of the bypass valve based on exhaust gas temperature, engine flow rate, and NOx output.

18. The method according to claim 17, wherein the first exhaust after-treatment system includes at least a first reductant source, a first mixer, and a first SCR, and wherein the second exhaust after-treatment system includes at least a second reductant source, a second mixer, and a second SCR, and wherein the first SCR is smaller than the second SCR.

19. The method according to claim 18, including connecting an inlet pipe between the first bypass pipe and an inlet to the first exhaust after-treatment system, connecting an outlet pipe between an outlet from the first exhaust after-treatment system to the first bypass pipe, and locating the turbocharger downstream of the inlet pipe and upstream of the outlet pipe.

20. The method according to claim 19, including locating the bypass valve in the inlet pipe or in the first bypass pipe downstream of the inlet pipe, and only having the bypass valve in the second position during cold start or low flow conditions, and actively adjusting the third position during high temperature and/or high flow conditions to vary portions of exhaust gas flow directed to the first exhaust after-treatment system and the turbocharger.

21. The method according to claim 16, wherein the second bypass includes a second bypass pipe, and including connecting the second bypass pipe between the engine outlet and the inlet to the second exhaust after-treatment system such that all exhaust flow bypasses the first exhaust after-treatment system and the turbocharger, and including a fifth position where one portion of exhaust gas flow is directed into the first exhaust after-treatment system, another portion of exhaust gas flow is directed into the turbocharger, and a remaining portion of exhaust flow is directed into the second bypass to allow for proportional flow between the first exhaust after-treatment system, turbocharger, and through an empty pipe volume of the second bypass.

22. A vehicle comprising:

an engine;

a vehicle exhaust system including a first exhaust after-treatment system that receives exhaust gases generated by the engine, a second exhaust after-treatment system downstream of the first exhaust after-treatment system, and at least a first bypass and a second bypass;

a turbocharger associated with the first bypass, and wherein the second bypass connects an engine outlet directly to an inlet to the second exhaust after-treatment system such that all exhaust flow bypasses the first exhaust after-treatment system and the turbocharger;

a bypass valve located upstream of the turbocharger, wherein the bypass valve is moveable between a first position to prevent exhaust gas flow to the first exhaust after-treatment system, a second position to direct all exhaust gas flow to the first exhaust after-treatment system, a third position where one portion of exhaust gas flow is directed into the first exhaust after-treatment system and a remaining portion of exhaust gas flow is directed into the turbocharger, and a fourth position to prevent exhaust gas flow into the turbocharger and the first exhaust after-treatment system, and wherein the bypass valve comprises a common valve that moves between the first, second, third and fourth positions; and a controller that controls movement of the bypass valve between the first, second, third, and fourth positions.

23. The vehicle according to claim 22, wherein the first exhaust after-treatment system includes at least a first fluid source, a first mixer element, and a first SCR, and wherein the second exhaust after-treatment system includes at least a second fluid source, a second mixer, and a second SCR, and wherein when the bypass valve is in the first position, all exhaust gas flow to the first exhaust after-treatment system is blocked such that all exhaust gas flow bypasses the first exhaust after-treatment system and is directed into the turbocharger prior to entering the second exhaust after-treatment system, when the bypass valve is in the second position, all exhaust gas flow is directed into the first exhaust after-treatment system and bypasses the turbocharger before the flow enters the second exhaust after-treatment system, when the bypass valve is in the third position, one portion of exhaust gas flow is directed into the first exhaust after-treatment system and a remaining portion of exhaust gas flow is directed into the turbocharger prior to entering the second exhaust after-treatment system, when the bypass valve is in the fourth position all exhaust gas flow to the first exhaust after-treatment system is blocked and all exhaust gas flow to the turbocharger is blocked such that all exhaust flow is directed into the second bypass, and including a fifth position where one portion of exhaust gas flow is directed into the first exhaust after-treatment system, another portion of exhaust gas flow is directed into the turbocharger, and a remaining portion of exhaust flow is directed into the second bypass to allow for proportional flow between the first exhaust after-treatment system, turbocharger, and through an empty pipe volume of the second bypass.

24. The vehicle according to claim 23, wherein the controller controls movement of the bypass valve based on based on engine flow rate and NOx output.

* * * * *